Aug. 25, 1931.  G. P. PARDUE ET AL  1,820,153
COTTON CHOPPER
Filed April 19, 1930   4 Sheets-Sheet 1
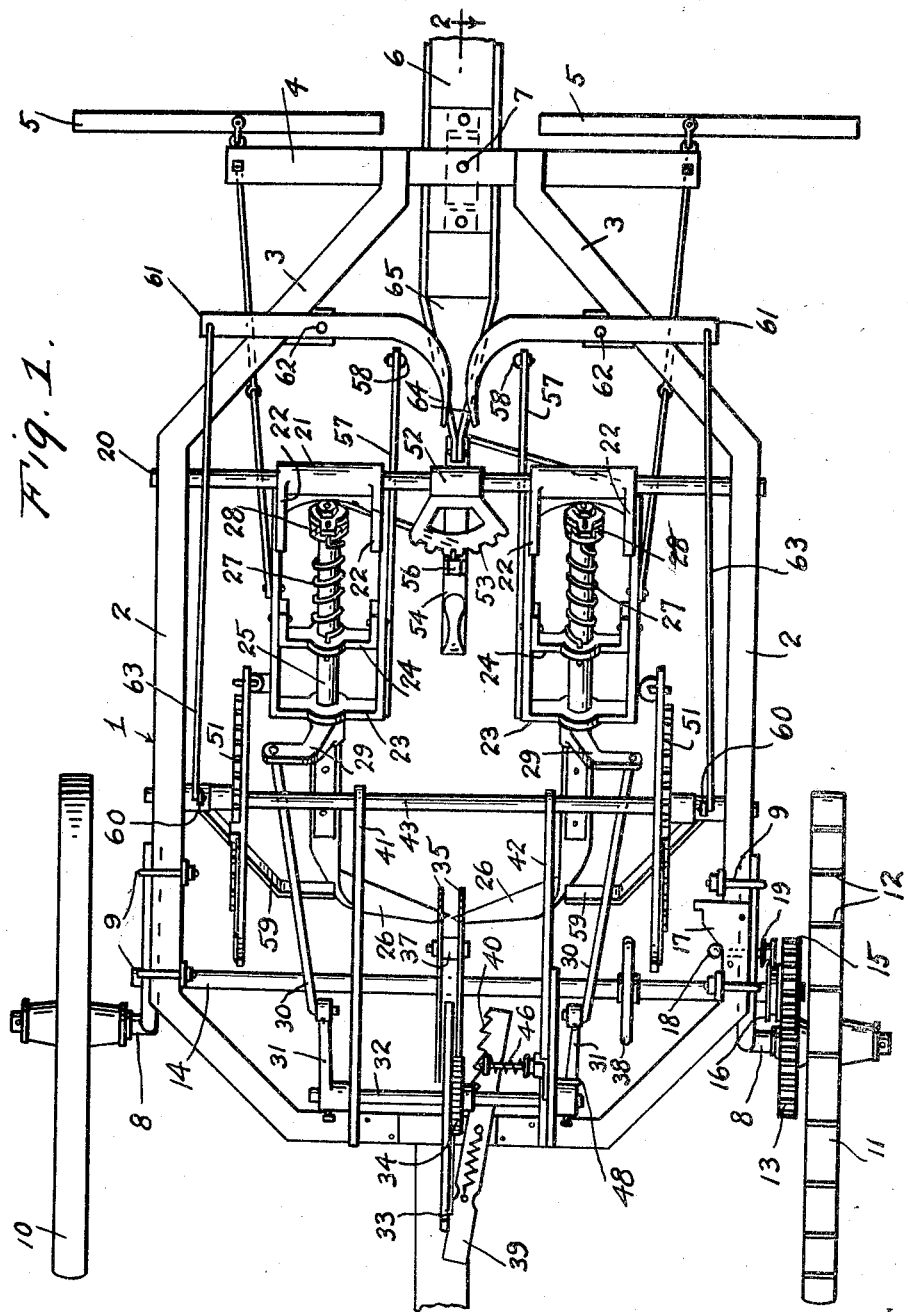
Inventors
George P. Pardue
Charles Holbrook
By Clarence A. O'Brien
Attorney

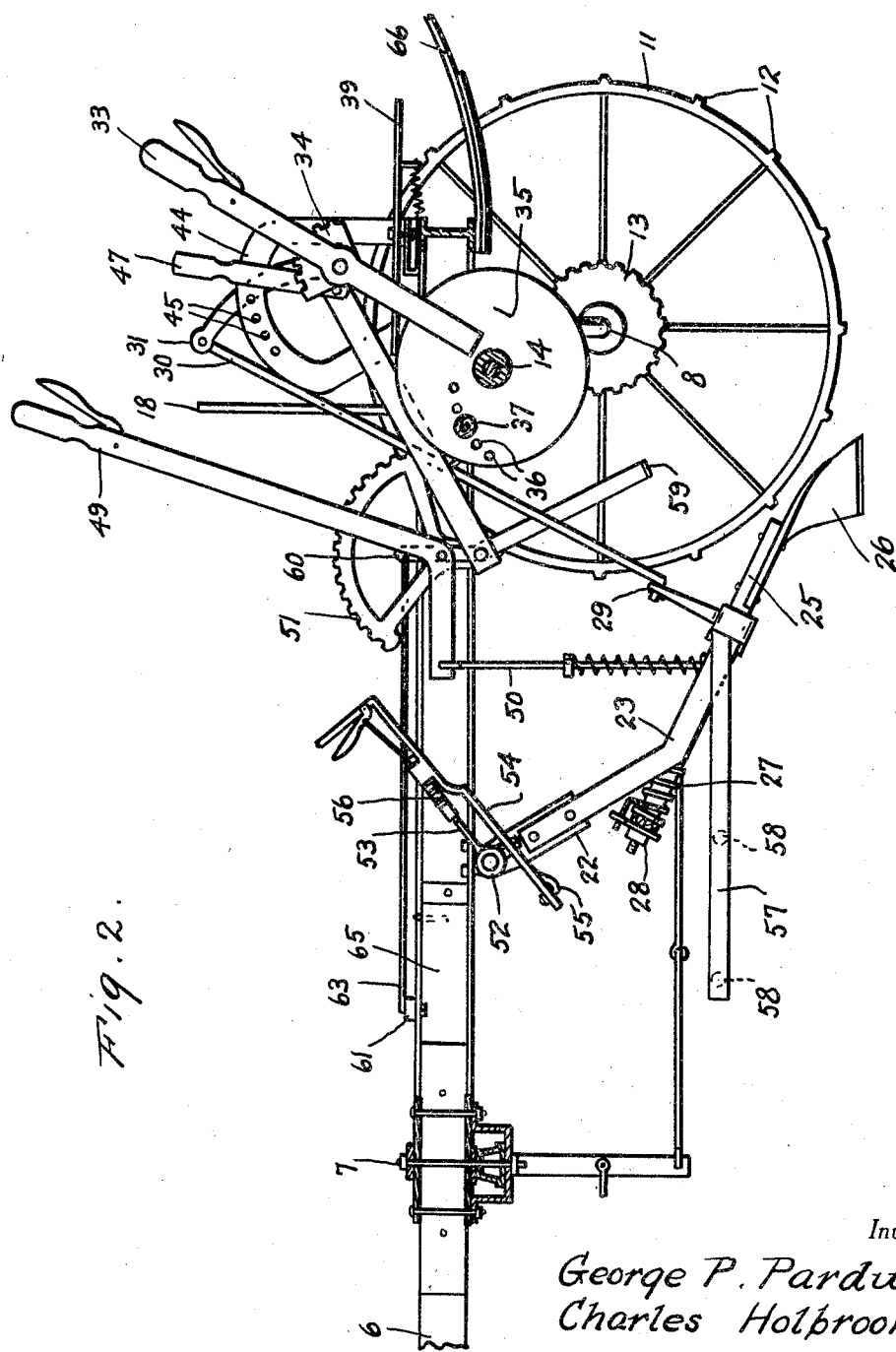

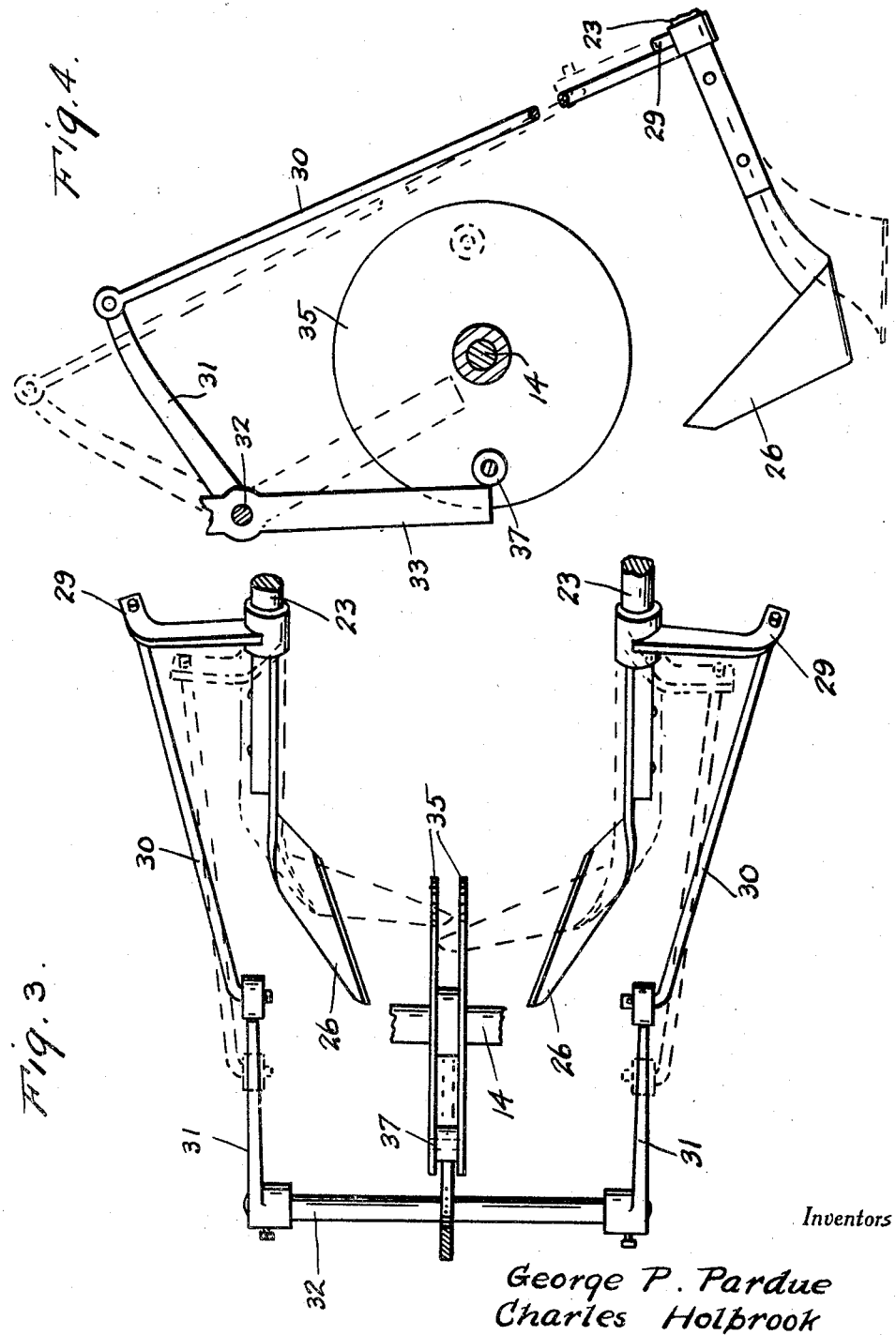

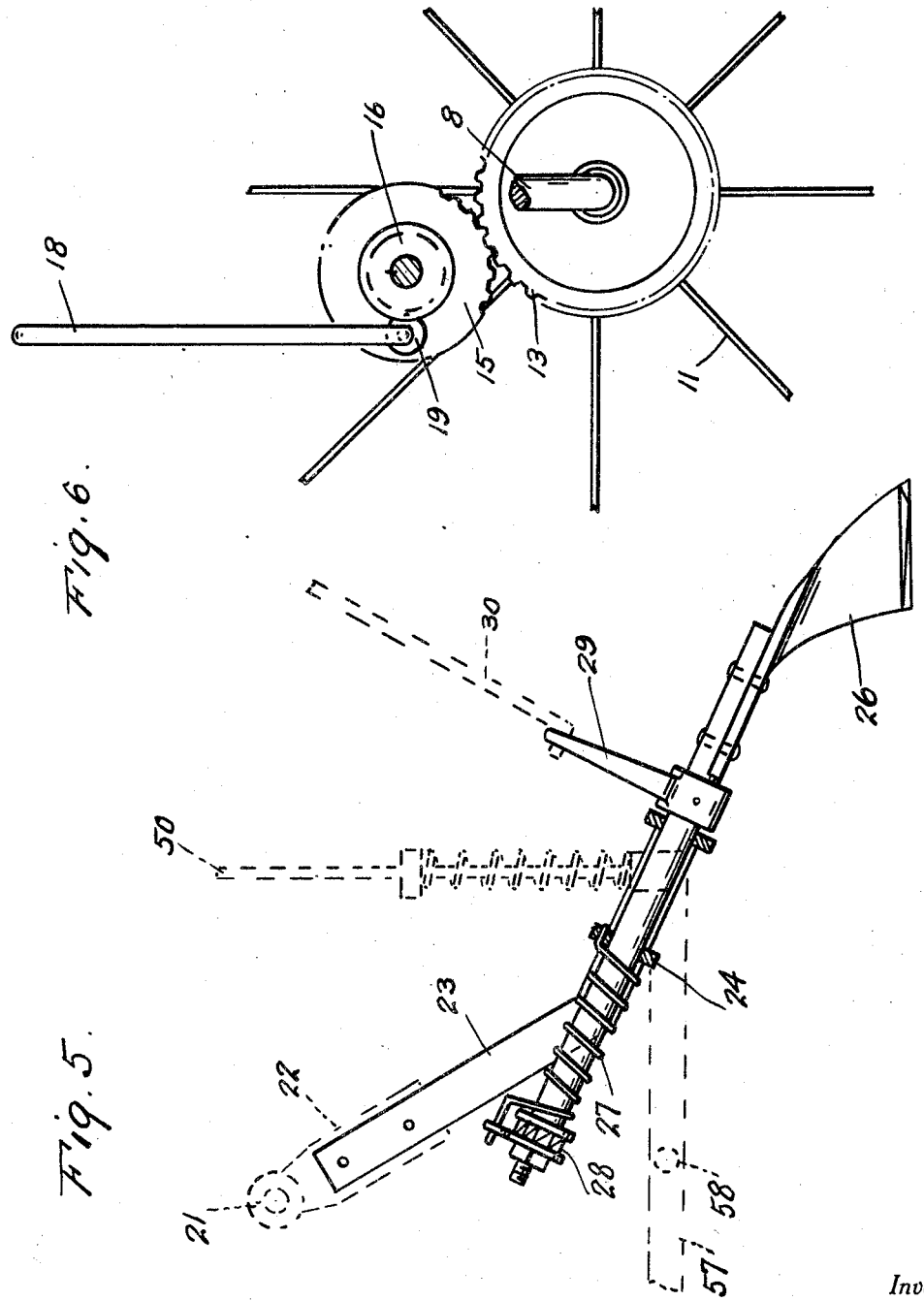

Patented Aug. 25, 1931

1,820,153

UNITED STATES PATENT OFFICE

GEORGE P. PARDUE AND CHARLES HOLBROOK, OF CALEXICO, CALIFORNIA

COTTON CHOPPER

Application filed April 19, 1930. Serial No. 445,679.

This invention relates to new and useful improvements in agricultural implements or machines and more particularly to devices of this character which are known as cotton choppers.

The primary object of the invention is to provide, in a manner as hereinafter set forth, a cotton chopper having a pair of chopping blades or hoes which are movably mounted thereon in a manner to periodically move to operative and inoperative position for the purpose of thinning the rows of stalks, said hoes being automatic in their actions and operated by power derived from the supporting wheels of the machine when the same is drawn over the ground.

Another important object of the invention is to provide a cotton chopper of the character described embodying a construction and arrangement of parts whereby the period of time in which the hoes are disposed in operative position to destroy the stalks may be expeditiously regulated at will.

A further important object of the invention is to provide a cotton chopper of the above mentioned character embodying manually operable means for retaining the hoes in inoperative position when it is so desired.

Other objects of the invention are to provide, in a manner as hereinafter set forth, a cotton chopper of the character described which will be comparatively simple in construction, strong, durable, efficient in its use and which may be manufactured at low cost.

All of the foregoing and still further objects and advantages of the invention may become apparent from a study of the following specification taken in connection with the accompanying drawings wherein like characters of reference designate corresponding parts throughout the several views, and wherein:—

Figure 1 is a top plan view of a cotton chopper constructed in accordance with this invention.

Figure 2 is a longitudinal sectional view taken substantially on the line 2—2 of Figure 1 looking in the direction indicated by the arrows.

Figure 3 is a detail view in top plan showing the chopping blades or hoes and the operating rod therefor.

Figure 4 is a detail view in side elevation of the elements shown in Figure 3.

Figure 5 is a detail view in longitudinal section showing the means for mounting the hoes.

Figure 6 is a detail view showing the power take-off from one of the supporting wheels.

Referring to the drawings in detail, it will be seen that the reference numeral 1 designates generally a metallic frame comprising the side bars 2 having the forwardly converging front end portions 3 which terminate in spaced relation to each other and are secured to the transversely extending beam 4 to the opposite end portions of which the singletrees 5 are operatively connected. A tongue 6 extends through the beam 4 and is pivotally connected thereto as at 7. Axles 8 are rigidly secured to the rear portions of the side bars 2 of the frame 1 through the medium of the U-bolts 9. Journaled for rotation on the axles 8 are the supporting wheels 10 and 11, the tread of the wheel 11 being provided with the traction lugs or cleats 12. A gear 13 is mounted on the axles 8 on the inner side of the wheel 11 and rigidly connected to the hub portion of said wheel for rotation therewith.

A horizontally disposed shaft 14 is rotatably mounted transversely in the frame 1, one end of said shaft projecting laterally from the frame and terminating adjacent the wheel 11. A gear 15 is rotatably mounted on the projecting end portion of the shaft 14 and is in constant mesh with the gear 13 for actuation thereby. A flanged clutch 16 is keyed for longitudinal movement on the projecting end portion of the shaft 14 and is adapted to operatively engage with the gear 15 to connect the same to said shaft 14. A cam plate 17 is mounted on the frame 1 adjacent the shaft 14 at the end portion thereof upon which the clutch 16 is mounted. A clutch actuating lever 18 has a right angularly disposed lower end portion extending rotatably and slidably through the frame 1 below the cam plate 17 and a grooved roller 19 is mounted on said lower end portion and engages with the flange of the clutch 16, as clearly illustrated in Figure 1. When the lever 18 is swung forward, the same engages with the cam plate 17 and is caused to move inwardly thus disengaging the clutch 16 from the gear 15 and said gear is free to rotate on the shaft 14. When the lever 18 is in its rearmost position, the clutch 16 will couple the gear 15 to the shaft 14 in a manner to actuate the latter.

A bar 20 of circular cross section is rigidly mounted transversely between the side bars 2 of the frame 1 in forwardly spaced relation to the shaft 14 and rotatably mounted in longitudinally spaced relation on said bar 20 is a pair of sleeves 21 having the integral rearwardly and downwardly extending arms 22 on their opposite ends to which are secured the free end portions of the substantially U-shaped brackets 23. Each of the brackets 23 has disposed transversely across an intermediate portion thereof a cross member 24. The rear end portions of the brackets 23 and the cross member 24 are provided with aligned openings through which rotatably extend the standards 25, said standards projecting upwardly and forwardly beyond the cross members 24. An inwardly directed chopper or hoe blade 26 is rigidly mounted on the lower end portion of each of the standards 25 and, as clearly indicated in dotted lines in Figure 3 of the drawings, the free ends of said hoe are disposed in overlapping relation with respect to each other when in operative position. In Figure 3 of the drawings the hoes are shown in full lines in inoperative position.

A coil spring 27 encircles the upwardly projecting end portion of each of the standards 25 and has one end anchored to the respective cross members 24 and its opposite end operatively connected to an adjustable clutch device 28 mounted on the said standards 25. As will be obvious the coil springs 27 are under tension and yieldingly urge the hoes 26 toward their operative position. Through the medium of the clutch devices 28, the tension of the coil springs 27 may be regulated.

An outwardly projecting arm 29 is rigidly mounted on each of the standards 25 adjacent the lower ends of the brackets 23 and said arms 29 are operatively connected by the rods 30 to the free ends of the arms 31 which are fixed on the opposite end portions of the rocker shaft 32 which is rotatably supported on the rear end portion of the frame 1. The shaft 32 extends through an intermediate portion of a lever 33 in a manner to support said lever for swinging movement on an intermediate portion of said shaft 32. A segment 34 is fixed on the shaft 32 adjacent the lever 33 to receive a suitable latching device in the form of a detent of conventional construction for rigidly connecting said lever 33 with said shaft 32.

The lower end portion of the lever 33 is disposed between a pair of spaced, rigidly connected disks 35 which are fixed on an intermediate portion of the shaft 14. The disks 35 are provided with the tangentially extending series of aligned openings 36 for adjustably mounting a roller 37 therebetween. Said roller adapted to engage with the lower end portion of the lever 33 in a manner to actuate the same upon rotation of the shaft 14 and the disks 35. A hand wheel 38 is fixed on the shaft 14 for manually rotating said shaft for a purpose which will be hereinafter set forth. A spring controlled lever 39 is pivotally mounted on the rear end portion of the frame 1 and has provided in its forward end portion a series of notches 40 for engagement with the lower end portion of the lever 33 for retaining the same out of the path of the roller 37 when it is so desired. The shaft 32 is rotatably supported in the longitudinally disposed, spaced, parallel bars 41 and 42 which have their rear ends supported on the rear ends of the frame 1 and their forward ends supported on the transversely extending bar 43 which is supported between the side members 2 of said frame 1. A substantially inverted U-shaped bracket 44 (see Figures 1 and 2) is vertically mounted with one end secured to the rear end member of the frame 1 and its opposite end secured to an intermediate portion of the bar 42. The bight portion of the bracket 44 is provided with a series of spaced openings 45. As best seen in Figure 1 of the drawings, an inwardly extending pin 46 is rigidly mounted on the bar 42 adjacent the bracket 44 and mounted for sliding and swinging movement on said pin is a lever 47 which intersects the bight portion of the bracket 44 and is yieldingly urged toward the same through the medium of a coil spring mounted on the pin 46. The lever 47 has fixed on one side thereof a laterally projecting pin 48 which is adapted to be selectively inserted through the openings 45 of the bracket 44 in which position it is disposed in the path of the adjacent arm 31 and constitutes a stop for limiting the rearward swinging movement of said arm.

Manually operable bell crank levers 49 are mounted on the shaft 43 adjacent its opposite end and the lower ends of said levers 49 are operatively coupled to the brackets 44 through the medium of the connecting rods 50. Segments 51 are fixed on the shaft 43 adjacent each of the levers 49 to receive a suitable keeper of conventional construction which is mounted on each of said levers for retaining the same against swinging movement. The levers 49 and connecting rods 50 constitute means for manually swinging the bracket 23 and the hoes 26 upwardly to inoperative position when it is so desired.

It will be readily obvious that the continued use of the machine will result in the wearing off of the overlapping points of the hoes 26 and to compensate for this wear, a sleeve 52 is rigidly mounted on the bar 20 intermediate the sleeve 21 and formed integrally on said sleeve 52 is a toothed segment 53. A manually operable lever 54 has an intermediate portion pivotally connected to the lower side of the sleeve 52 (see Figure 2) and connecting rods 55 are pivotally connected to the lever 54 on opposite sides of the pivotal support thereof and one of said rods 55 is connected to each of the sleeves 21. A manually operable spring controlled detent 56 is mounted on the lever 54 for retaining said lever 54 in adjusted position. The detent 56 is engageable with the segment 53. As will be obvious when the detent 56 is disengaged from the segment 53, the lever 54 may be actuated in a manner to draw the sleeve 21 toward each other thus moving the hoes 26 inwardly into overlapping relation with respect to each other.

A pair of spaced, parallel sight rods 57 are mounted on the hoe supporting bracket 23, said rods being mounted on the inner opposite sides of the bracket and mounted in longitudinally spaced relation on said rods 57 are the sight beads 58. Foot operated cranks 59 are mounted for swinging movement on the opposite end portion of the shaft 43 and depend therefrom. Formed integrally on the bearing eyes of each of the foot cranks 59 is an upstanding arm 60. Mounted for swinging movement in a horizontal plane on intermediate portions of the converging portion 3 of the side members 2 of the frame 1 is a pair of transversely disposed levers 61 the intermediate portions of which are pivotally connected on the portions 3 of the side members as indicated at 62. The outer ends of the levers 61 are operatively connected to the arms 60 for actuation thereby through the medium of the rods 63. At their inner ends, the levers 61 terminate in rearwardly curved spaced opposed cam portions 64 between which the pointed rear end portion 65 of the tongue 6 is disposed. An operator's seat 66 is mounted on the rear end of the frame 1.

In use, the machine is driven over the row of cotton stalks and the lever 18 is swung to its rear position to engage the clutch 16 with the gear 15 in a manner to cause the rotation of the shaft 14. Rotation of the shaft 14, of course, imparts rotary movement to the disks 35 which are fixed thereon and the roller 37 which is mounted between said disks will engage with the lower end portion of the lever 33 in a manner to swing the upper end of said lever forwardly. It should be here stated that the disks 35 are rotated in a clockwise direction. Swinging movement of the lever 33 will rock the shaft 32 through the medium of the segment 34 and the detent which engages therewith and which is mounted on said lever 33. Upon actuation of the shaft 32, the arms will be swung forwardly and downwardly and impart rotary movement to the standards 25 through the medium of the arms 29 and the connecting rods 30 in a manner to swing the hoes upwardly and away from each other to inoperative position as illustrated in full lines in Figure 3 of the drawings. It will thus be seen that the hoes 26 are periodically raised to inoperative position with each complete revolution of the disks 35. The rotation of the standards 25 in a direction to raise the hoes 26 has the effect of winding the coil spring 27 tighter and as soon as the roller 37 passes the lower end of the lever 33, the hoes and all of the operating elements which are connected thereto between the same and the disks 35 will be returned to their original position by said spring 27.

The length of the period of time in which the hoes are in operative position as compared with the length of the period of time in which said hoes are in inoperative position is governed by the position of the roller 37 between the disks 35. As before stated, the roller 37 is adapted to be selectively supported in the pairs of openings 36 in said disks 35. The length of time of the operative and inoperative periods of the hoes 26 is also determined by the position of the lever 33 with respect to the shaft 32 and the segment 34. By swinging the lever 33 forwardly and securing the same to the shaft 32, the operating period of the hoes is increased and the non-operating period is correspondingly decreased.

The depth at which the hoes 26 operate is governed and regulated through the medium of the levers 49 which are connected to the bracket 23 which rotatably supports the hoes through the medium of the rods 50. By swinging the lever 49 forwardly or rearwardly the bracket 23 and the hoes 26 thereon may be lowered or raised. The pin 48 which projects through the substantially inverted U-shaped bracket 44 constitutes a stop member for arresting the return movement of the hoes to operative position under the impulse of the springs 27 when the roller 37 passes the lever 33. Said pin being disposed in the path of the adjacent arms 31 on its rearward swinging movement for engagement thereby. When the elevation of the hoes 26 is changed through the medium of the levers 49 it is necessary to change the position of the stop pin 48 in order that said hoes will be disposed in proper position when arrested by said stop pin. It is for this purpose that the series of openings 45 is provided in the bracket 44.

As hereinbefore stated, any wear which occurs from use on the pointed ends of the hoes 26 may be compensated for by shifting the lever 54 in a direction to draw the sleeves 21 together or toward each other until the free end portions of the hoes are disposed in overlapping relation as indicated in dotted lines in Figure 3 of the drawings.

As will be obvious, the machine as illustrated in the drawings is adapted to be drawn by draft animals. When traveling over the ground the operator sits on the seat 66 and places one of his feet on each of the foot cranks 59. By pushing forwardly on either one of said foot cranks, the tongue 6 may be swung in a horizontal plane from right to left through the medium of the cam levers 61 and the connecting rod 63 which couples said levers to the foot cranks 59. It has been found that the draft animals will respond and be guided by this movement of the tongue 6.

When traveling over a row of cotton stalks, the operator observes said row passing between the sight bars 57 and when the row is observed to be sufficiently thin as not to need being further thinned, the operator swings the lever 39 in a manner to engage the same with the lower end portion of the lever 33 in a manner to retain said lever in operative position to secure the hoes in raised inoperative position. When the lever 39 is disengaged from the lever 33, the coil springs 27 will again return the hoes to their operative or cutting position and the periodical raising and lowering of said hoes will continue.

When starting at the beginning of a row, the roller 37 may be properly positioned with respect to the lever 33 by rotating the shaft 14 through the medium of the handle wheel 38 when the clutch 16 is disengaged by the gear 15.

It is believed that the many advantages of a cotton chopper constructed in accordance with this invention will be readily understood, and although the preferred embodiment of the invention is as illustrated and described, it is to be understood that changes in the details of construction may be had which will fall within the scope of the invention as claimed.

What is claimed is:—

1. A cotton chopper comprising a wheeled frame, a bar mounted transversely on the frame, a pair of spaced, parallel brackets mounted for sliding and swinging movement on the bar, standards rotatably mounted in the brackets, hoes on one end portion of the standards, means operatively connecting the standards to one of the wheels for rotary actuation in one direction by said wheel, coil springs encircling the other end portions of the standards and connected thereto and to the brackets for rotating the standards in the other direction.

2. A cotton chopper comprising a wheeled frame, a bar mounted transversely on the frame, a pair of spaced, parallel brackets mounted for sliding and swinging movement on the bar, standards rotatably mounted in the brackets, hoes on one end portion of the standards, means operatively connecting the standards to one of the wheels for rotary actuation in one direction by said wheel, coil springs encircling the other end portions of the standards and connected thereto and to the brackets for rotating the standards in the other direction, a sleeve fixed on the bar intermediate the brackets, a toothed segment extending from the sleeve, a hand lever pivotally mounted for swinging adjustment on the sleeve, rods operatively connecting the brackets to the hand lever for simultaneous adjustment in opposite directions on the bar, a detent on the hand lever engageable with the segment for retaining the lever in adjusted position.

3. A cotton chopper comprising a wheeled frame, a bar mounted transversely on the frame, a pair of spaced, parallel brackets mounted for sliding and swinging movement on the bar, standards rotatably mounted in the brackets, hoes on one end portion of the standards, means operatively connecting the standards to one of the wheels for rotary actuation in one direction by said wheel, coil springs encircling the other end portions of the standards and connected thereto and to the brackets for rotating the standards in the other direction, a sleeve fixed on the bar intermediate the brackets, a toothed segment extending from the sleeve, a hand lever pivotally mounted for swinging adjustment on the sleeve, rods operatively connecting the brackets to the hand lever for simultaneous adjustment in opposite directions on the bar, a detent on the hand lever engageable with the segment for retaining the lever in adjusted position, a pair of hand levers pivotally supported on the frame, rods operatively connecting the last named levers to the brackets for swinging the brackets in a vertical plane, and means for retaining the last named levers in adjusted position.

4. A cotton chopper comprising a wheeled frame, a bar mounted transversely on the frame, a pair of spaced, parallel brackets mounted for sliding and swinging movement on the bar, standards rotatably mounted in the brackets, hoes on one end portion of the standards, means operatively connecting the standards to one of the wheels for rotary actuation in one direction by said wheel, coil springs encircling the other end portions of the standards and connected thereto and to the brackets for rotating the standards in the other direction, said means comprising a rotary shaft journaled transversely on the frame, meshed gears fixed on the wheel and rotary shaft for operatively coupling the shaft to the wheel, a pair of spaced, opposed disks fixed on the rotary shaft, a roller mounted between the disks, a rock shaft mounted on the frame, a lever fixed intermediate its ends on the rock shaft and having one end portion extending between the disks in the path of the roller for engagement and actuation by said roller, arms fixed on the rock shaft, arms fixed on the standards, rods operatively connecting the rock shaft arms to the standard arms.

5. A cotton chopper comprising a wheeled frame, a bar mounted transversely on the frame, a pair of spaced, parallel brackets mounted for sliding and swinging movement on the bar, standards rotatably mounted in the brackets, hoes on one end portion of the standards, means operatively connecting the standards to one of the wheels for rotary actuation in one direction by said wheel, coil springs encircling the other end portions of the standards and connected thereto and to the brackets for rotating the standards in the other direction, said means comprising a rotary shaft journaled transversely on the frame, meshed gears fixed on the wheel and rotary shaft for operatively coupling the shaft to the wheel, a pair of spaced, opposed disks fixed on the rotary shaft, a roller mounted between the disks, a rock shaft mounted on the rock shaft and having one end portion extending between the disks in the path of the roller for engagement and actuation by said roller, arms fixed on the rock shaft, arms fixed on the standards, rods operatively connecting the rock shaft arms to the standard arms, an upstanding, substantially inverted U-shaped bracket mounted on the frame adjacent one of the rock shaft arms and having a series of openings in its bight portion, a stop pin selectively insertable in the openings for engagement by said one rock shaft arm for limiting the movement of the rock shaft arms in one direction.

6. A cotton chopper comprising a wheeled frame, a bar mounted transversely on the frame, a pair of spaced, parallel brackets mounted for sliding and swinging movement on the bar, standards rotatably mounted in the brackets, hoes on one end portion of the standards, means operatively connecting the standards to one of the wheels for rotary actuation in one direction by said wheel, coil springs encircling the other end portions of the standards and connected thereto and to the brackets for rotating the standards in the other direction, said means comprising a rotary shaft journaled transversely on the frame, meshed gears fixed on the wheel and rotary shaft for operatively coupling the shaft to the wheel, a pair of spaced, opposed disks fixed on the rotary shaft, a roller mounted between the disks, a rock shaft mounted on the rock shaft and having one end portion extending between the disks in the path of the roller for engagement and actuation by said roller, arms fixed on the rock shaft, arms fixed on the standards, rods operatively connecting the rock shaft arms to the standard arms, an upstanding, substantially inverted U-shaped bracket mounted on the frame adjacent one of the rock shaft arms and having a series of openings in its bight portion, a stop pin selectively insertable in the openings for engagement by said one rock shaft arm for limiting the movement of the rock shaft arms in one direction, a lever pivotally mounted on the frame and engageable with the first named lever for retaining same against swinging movement out of the path of the roller.

In testimony whereof we affix our signatures.

GEORGE P. PARDUE.
CHARLES HOLBROOK.